March 19, 1929.   J. T. BISHOP   1,705,894
ENGINE
Filed Dec. 5, 1927   3 Sheets-Sheet 1
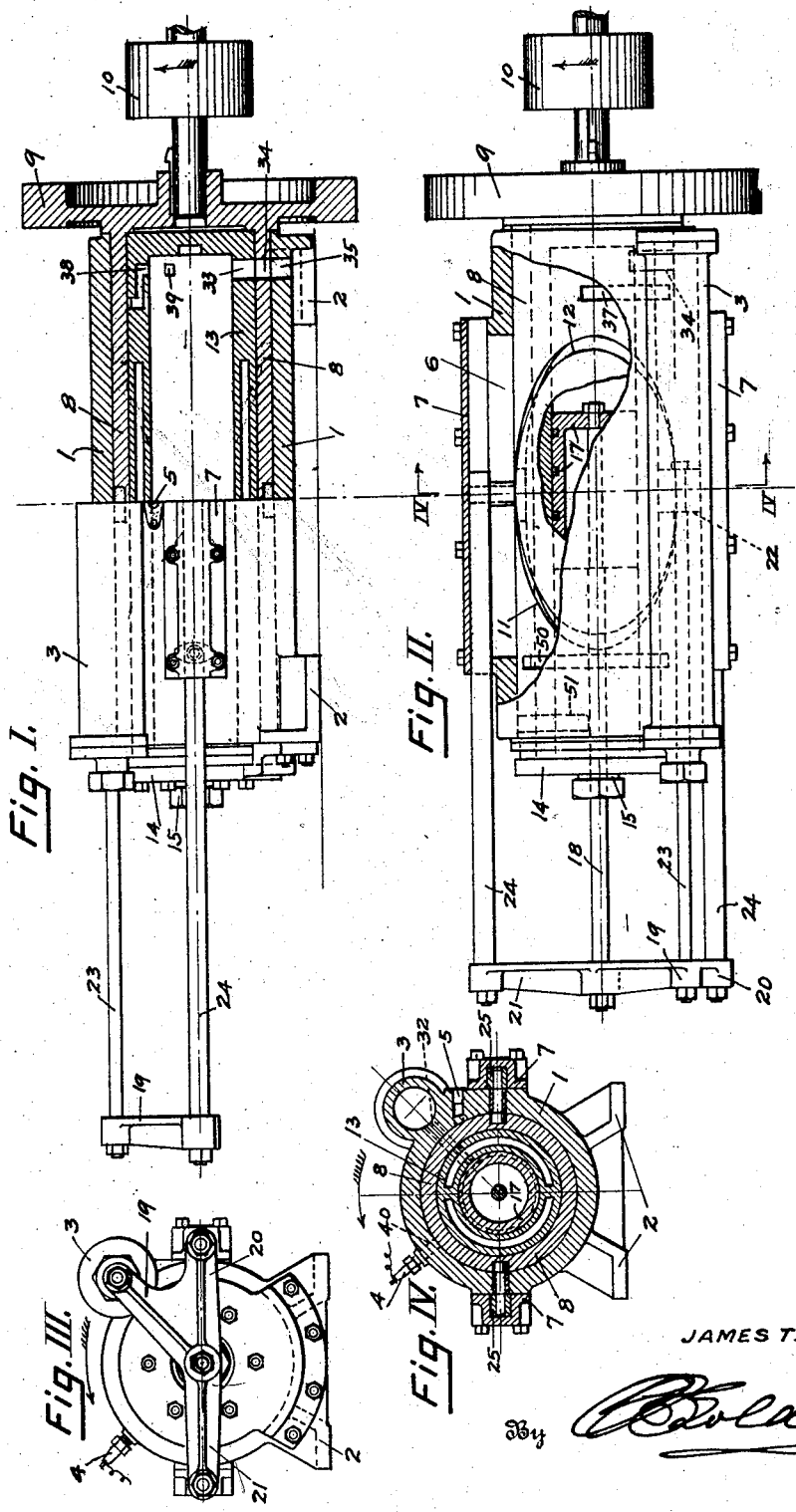
Inventor
JAMES T. BISHOP.

March 19, 1929.　　　J. T. BISHOP　　　1,705,894
ENGINE
Filed Dec. 5, 1927　　　3 Sheets-Sheet 2
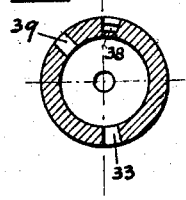
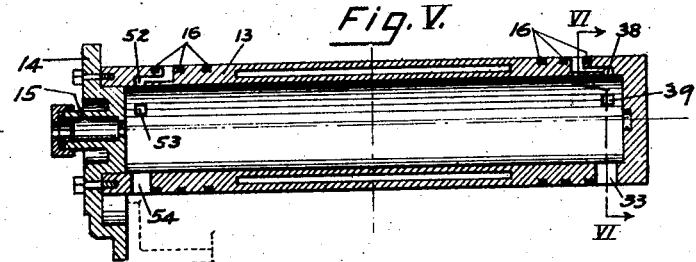
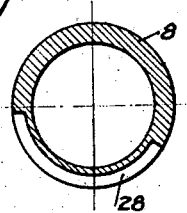
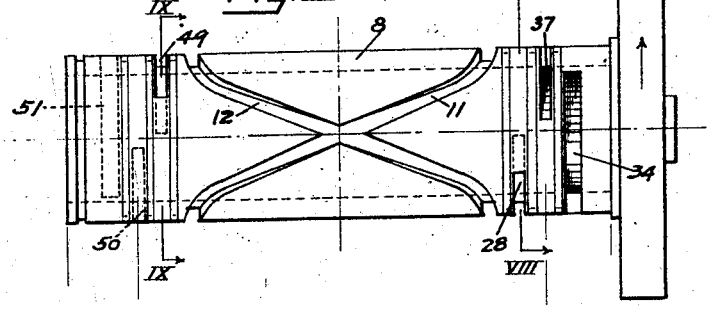
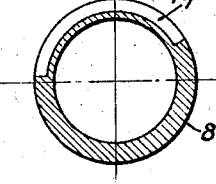
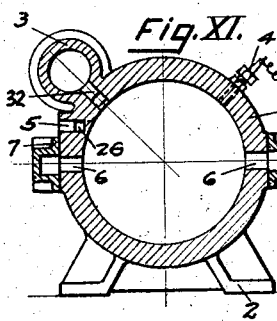
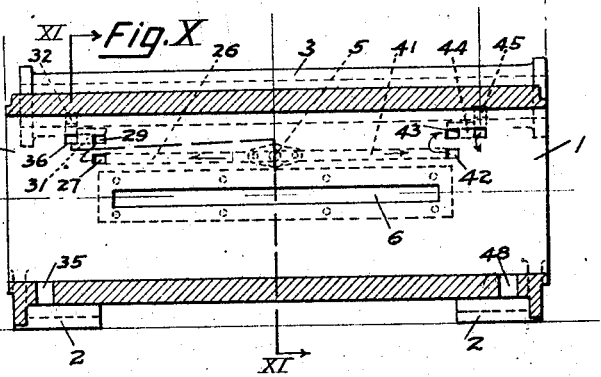
Inventor
JAMES T. BISHOP.
Attorney March 19, 1929.　　　J. T. BISHOP　　　1,705,894
ENGINE
Filed Dec. 5, 1927　　　3 Sheets-Sheet 3
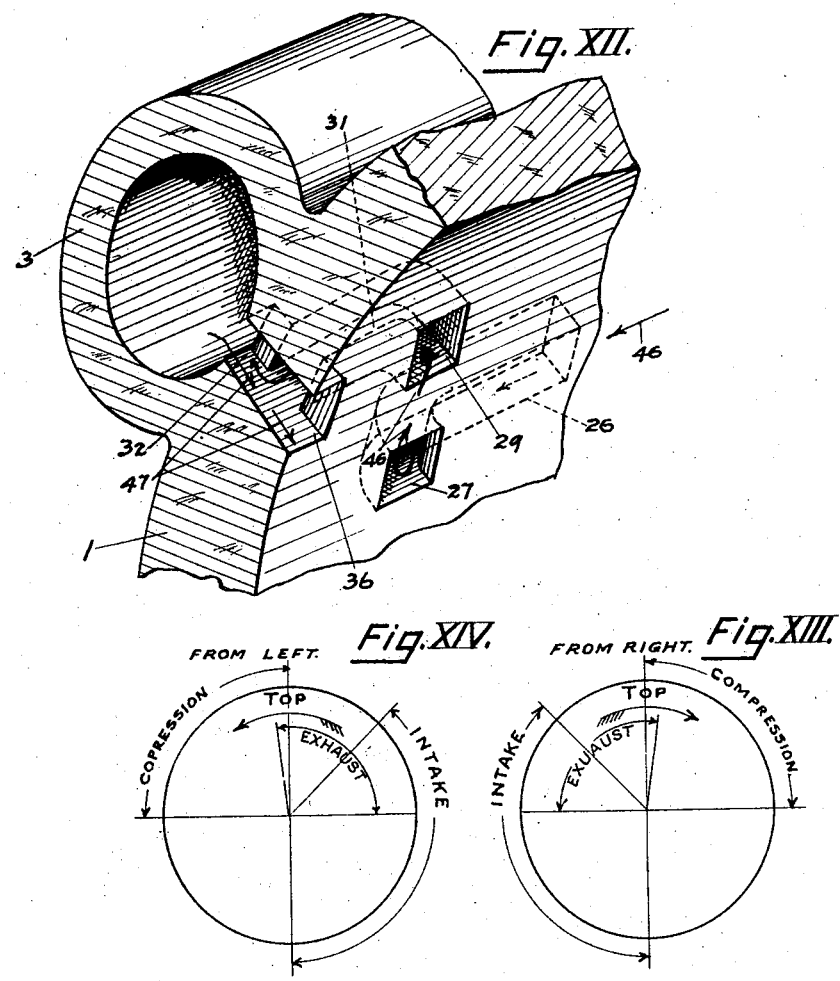
Inventor
JAMES T. BISHOP.

Patented Mar. 19, 1929.

1,705,894

UNITED STATES PATENT OFFICE.

JAMES T. BISHOP, OF PORTLAND, OREGON.

ENGINE.

Application filed December 5, 1927. Serial No. 237,677.

My invention relates to engines, in which a stationary casing encircles a rotating sleeve; the latter encircles a stationary explosion cylinder; a piston which reciprocates in the explosion cylinder, rotates the sleeve; and the rotating sleeve in its revolutions opens and closes the various ports which admit or discharge the driving gases.

The objects of my invention are to produce an engine in which the explosive mixture not only acts on both sides of the piston but actually gives two power impulses during each revolution; which operates without a crank, and without poppet valves; which is equally well adapted for gas, steam or compressed air; which yields a large amount of power considering its light weight and the small space which it occupies; and which as a gas engine operates on the two stroke cycle.

Other objects and advantages will be described in the specification and particularly pointed out in the appended claims.

I attain these objects with the mechanism, illustrated in the accompanying drawings, in which:

Fig. I is a side elevation of my engine, part thereof being shown in section.

Fig. II is a plan view of Fig. I, a part thereof being broken away.

Fig. III is an end view of Fig. I.

Fig. IV is a section through Fig. II along the line IV—IV.

Fig. V is a longitudinal section through the explosion cylinder.

Fig. VI is a section through Fig. V along the line VI—VI.

Fig. VII is an exterior view of the rotating sleeve.

Fig. VIII is a section through Fig. VII along the line VIII—VIII.

Fig. IX is a section through Fig. VII along the line IX—IX.

Fig. X is a longitudinal section through the outer casing, looking toward the compression cylinder.

Fig. XI is a section through Fig. X along the line XI—XI.

Fig. XII is a perspective view of a portion of the outer casing with its compression cylinder and ports.

Fig. XIII is a diagram of the relative position of the ports at one end of the rotating sleeve.

Fig. XIV is a diagram of the relative position of the ports at the other end of the rotating sleeve.

Similar numerals refer to similar parts throughout the several views.

The outer casing 1 is open at each end, and supported on the legs 2; the inside surface must be ground true. On the outside of the casing 1 and removed forty-five degrees from the top is a compression cylinder 3 which extends substantially throughout the entire length of the casing 1 and forms an integral part thereof. Mounted at each end of the casing 1 is a spark plug 4. At the center of the casing 1, below the compression cylinder 3 is an opening 5 to which a carburetor may be attached. Besides several canals and ports which will be described later, there is a long slot 6 in each side of the casing 1, with a grooved plate 7 covering each slot.

Inserted into the casing 1 is a rotating sleeve 8 with the outer and inner surfaces ground true. A flywheel 9 with a main pulley 10 is attached to one end of the rotating sleeve 8, the other end is left open. Cut into the outer surface of the sleeve 8 are two intersecting sinusoidal grooves 11 and 12, the intersection being at the opposite sides of the sleeve 8; the distance between the nodes of the curves 11 and 12 is equal to the length of the slot 6 in the outer casing 1. At each end of the rotating sleeve 8 are several ports and canals, the purpose and function of which will be described later.

Inserted into the rotating sleeve 8 is an explosion cylinder 13 whose outer and inner surfaces must be ground true. That end of the explosion cylinder which is directed toward the flywheel 9 is closed while the other end is provided with a head 14 and a stuffing gland 15. The head 14 is also bolted to the outer casing 1 so that no rotation of the explosion cylinder 13 can take place. Rings 16 in the outside surface of the explosion cylinder 13 insure an air tight fit with the rotating sleeve 8. The various ports in each end of the explosion cylinder 13 will be described later.

Mounted within the explosion cylinder 13 is a piston 17 whose piston rod 18 extends through a gland 15 and carries at the outside terminal a triple armed yoke. One of said arms 19 extends radially toward the compression cylinder 3 and the other two arms 20 and 21 toward the slots 6 in the outside casing 1. By connecting the first-mentioned arm 19 with a piston 22 in the compression cylinder 3, through a piston rod 23, said piston 22 will be compelled to follow the movements of the piston 17 in the explosion cylinder 13. The rods 24 from the other arms, 20 and 21, are guided by the grooved plates 7 and carry at their ends the pins 25 which extend through the slots 6 in the outer casing 1 and are adapted to move in the sinusoidal grooves 11 and 12 of the rotating sleeve 8. The result of this arrangement is that the reciprocating movement of the piston 17 in the explosion cylinder will produce a rotating movement in the sleeve 8. One arm 20 or 21 would be sufficient to rotate the sleeve 8, in which case only one sinusoidal groove 11 or 12 would be required, but in order to eliminate unequal strains in the wall of the rotating sleeve 8, two arms, and consequently two intersecting sinusoidal grooves in the sleeve are preferred. This completes the description of the main elements of construction, and attention may now be directed to the path of the driving gases.

Assuming that an explosion at the flywheel-end of the explosion cylinder 13 has taken place, the pistons in both the explosion cylinder 13 and the compression cylinder 3 will be forced away from the fly-wheel end; gas from the carburetor will be sucked into the opening 5, and into the canal 26 (shown in the left side of Fig. X) which proceeds longitudinally in the wall of the casing 1 and terminates in a port 27 which latter is directed toward the rotating sleeve 8. Said sleeve 8 in the meantime, rotating under the impulse of the moving piston 17, brings a groove 28 (shown on the right side of Fig. VII) in the sleeve 8 in alinement with the ports 27 and 29, (Fig. X), and establishes thereby communication between the two ports 27 and 29 in the casing 1, from whence the gases are sucked into the compression cylinder 3 first through a canal 31 in the casing 1 and then a port 32 terminating in the compression cylinder 3. There is, as yet, no communication between the compression cylinder 3 and the explosion cylinder 13. But the piston 17 continues to move away from the flywheel; the sleeve 8 continues its rotation and before the piston 17 reaches its end position three exhaust ports—one, 33, in the explosion cylinder 13 (Fig. V), one, 34, in the rotating sleeve 8 (Fig. VII) and one, 35, in the outer casing 1 (Fig. X, see also Fig. I) are brought in registering alinement. With a quick scavenger puff the pressure in the explosion cylinder 13 is permitted to escape into the outside air; the piston 17 immediately thereafter reverses its stroke and travels toward the flywheel 9 driving the spent gases through the still open exhaust ports until the piston 17 approaches near to the other end. Now the exhaust ports close and instead of that the precompressed gases from the compression cylinder 3 enter the explosion cylinder 13 through the following intake ports: the port 36 in the outer casing 1, the port 37 in the sleeve 8 and the port 38 in the explosion cylinder 13. Thereupon the intake ports close, the gas receives its final compression in the explosion cylinder 13, and at the same time the port 39 in the explosion cylinder 13, and the port 34 in the sleeve 8, and the port 40 in the outer casing 1 establish communication with the spark plug 4; another explosion takes place and the cycle begins anew.

The same process except in reverse order takes place at the other end of the explosion cylinder 13 and it only remains to designate the various ports and canals with the proper numerals. In the outer casing 1 (to the right of Fig. X) are to be found the canal 41, port 42, port 43, canal 44 and port 45, which lead from the carburetor to the compression cylinder 3, (especially in Fig. XII the path of the gases is very clearly indicated by the arrows 46; in the same figure the path along which the compressed gases are sent at the proper moment from the compression cylinder to the explosion cylinder are marked by the arrow 47). The exhaust port at this end is indicated by the numeral 48 in the Fig. X.

In the rotating sleeve 8 (to the left of Fig. VII there are: first, the groove 49 which leads the explosive gases into the compression cylinder 3; second, the port 50 which leads the partly compressed gases from the compression cylinder 3 to the explosion cylinder 13; and finally the port 51 which permits the exhaust from the explosion cylinder 13, the same port 51 serves to establish communication with the spark-plug 4.

In the explosion cylinder Fig. V are: the port 52 which admits the partly compressed gases; the port 53 which communicates with the spark-plug; and finally the exhaust port 54.

The relative angular position of the ports and canals at both ends of the engine is, of course, governed by the fact that one compression cylinder must supply alternately charges to both ends of the engine.

It has been mentioned before that this engine could with equal success be used for steam or compressed air, in which case a steam or compressed air line should be substituted for the carburetor, and a spark-plug would not be required.

Having thus described my invention, it will be seen that my objects have been accomplished, and, though I have shown the preferred form of construction, I reserve to myself the right to make minor changes, providing I do not contravene the spirit and principle of my invention.

I claim:

1. In an engine, the combination of three nested cylinders, the outer and inner cylinder being stationary, the intermediate cylinder being rotatable, a piston reciprocating in the inner cylinder and rotating the intermediate cylinder, and means to admit and expel driving gases to and from the inner cylinder by means of the rotating cylinder, said means including a compression cylinder, and a piston reciprocating in the compression cylinder.

2. In an engine, the combination of three nested cylinders comprising a stationary casing, a rotating sleeve, and a stationary explosion cylinder, a piston reciprocating in the explosion cylinder, and means to utilize the movement of the piston to rotate the sleeve and to regulate the admission and expulsion of the driving gases, said means including a compression cylinder and ports leading from the compression cylinder through the casing and the sleeve to the explosion cylinder.

3. In an engine, the combination of three nested cylinders, an outer and inner cylinder being stationary, the intermediate cylinder being rotatable, a piston reciprocating within the inner cylinder, and means to utilize the movement of the piston for the rotation of the intermediate cylinder and the admission and expulsion of the driving gases at both ends of the piston, said means including a compression cylinder, a piston in the compression cylinder, and ports at both ends of the compression cylinder.

4. In an engine, the combination of three nested cylinders cooperating with each other to admit and expel driving gases to and from the inner cylinder alternately at both ends of the inner cylinder, with a piston reciprocated in the inner cylinder and rotating the intermediate cylinder, a compression cylinder integrally with the outer cylinder and a piston in the compression cylinder, both pistons being rigidly connected and operating as a unit.

5. In an engine the combination of an outer casing, a rotating sleeve, and an explosion cylinder, all nested in each other, and a piston reciprocating in the inner cylinder, said outer casing comprising, a stationary cylinder mounted on legs, a compression cylinder extending substantially throughout the entire length of the outer casing and integrally therewith, and a piston in the compression cylinder operated by the piston in the explosion cylinder, the movements of both pistons having the same direction.

6. In an engine, the combination of an outer casing, a rotating sleeve, and an explosion cylinder all nested in each other, and a piston reciprocating in the explosion cylinder, said outer casing comprising a compression cylinder, and canals and ports leading through the rotating sleeve to and from the explosion cylinder and at both ends thereof.

7. In an engine the combination of an outer casing, a rotating sleeve, and an explosion cylinder all nested in each other, a longitudinal slot in the side of the outer casing and a piston reciprocating in the explosion cylinder and rotating the sleeve, said rotating sleeve comprising a cylinder open at one end, a flywheel structure closing the other end, ports and canals in the circumference of the rotating sleeve and at both ends thereof, a sinusoidal groove in the circumference of the rotating sleeve, said sinusoidal groove continuing endlessly around the circumference of the rotating sleeve, a pin actuated by the piston, said pin traversing said slot and entering the sinusoidal groove, the distance between the nodes of the sinusoidal groove being equal to the length of the slot in the outer casing.

8. In an engine, the combination of an outer casing, a longitudinal slot in each side of the outer casing, a rotating sleeve in the outer casing, an explosion cylinder stationarily in the rotating sleeve, and a piston reciprocating in the explosion cylinder and rotating the sleeve, said rotating sleeve having two intersecting sinusoidal grooves cut in its outer circumference, a pin traversing each slot and engaging an individual sinusoidal groove, both pins being actuated by the piston, the distance between the nodes of the intersecting sinusoidal grooves being equal to the length of the slots in the outer casing.

9. In an engine, the combination of an outer casing stationarily mounted, a rotating sleeve in the casing, a sinusoidal groove in the outer circumference of the rotating sleeve, a stationary explosion cylinder in the rotating sleeve, a cylinder head connecting the outer casing and the explosion cylinder at one end, a piston in the explosion cylinder, a piston rod extending through the cylinder head, a yoke at the end of the piston rod, and having two terminals, each adapted to hold a rod, a rod in each terminal of the yoke, said rod being directed toward the outer casing and proceeding parallel therewith, a pin in the terminal of the rod, said pin entering the sinusoidal groove through the outer casing and rotating the sleeve.

10. In an engine, the combination of an outer casing, a longitudinal slot in each side of the casing, a compression cylinder proceeding longitudinally with the outer casing and forming an integral part thereof, said compression cylinder being removed forty-five degrees from the top, a rotating sleeve in the outer casing, a stationary explosion cylinder in the rotating sleeve, a piston in the explosion cylinder, a piston rod, a triple-armed yoke at the end of the piston rod, one of said arms extending radially toward the compression cylinder, the others toward the slots in the casing, and a pin traversing each slot and rotating the sleeve, said two pins being actuated by the piston.

11. In an engine the combination of an outer casing, canals and ports in the walls of the outer casing, a compression cylinder integrally with the outer casing, a rotating sleeve in the outer casing, a groove in each end of the rotating sleeve, said groove transmitting driving gases through the canals and ports in the outer casing to the compression cylinder.

12. In an engine the combination of an outer casing, canals and ports in the wall of the outer casing, a compression cylinder integrally with the outer casing, a rotating sleeve in the outer casing, an explosion cylinder, a port in each end of the explosion cylinder, and a port in each end of the rotating sleeves admitting driving gases from the compression cylinder through the outer casing to the explosion cylinder, and exhaust ports at both ends of the casing, the rotating sleeve, and the explosion cylinder.

13. In an engine, the combination of an outer casing, a port in each end of the outer casing, a rotating sleeve in the outer casing, an explosion cylinder in the rotating sleeve, a port in each end of the explosion cylinder, and a port in each end of the rotating sleeve admitting exhaust gases from the explosion cylinder through the port in the outer casing to the outside air, and intake ports at both ends of the casing, the rotating sleeve, and the explosion cylinder.

14. In an engine, an outer casing, a spark plug at each end of the outer casing, a rotating sleeve in the outer casing, an explosion cylinder in the rotating sleeve, a port in each end of the explosion cylinder, and a port at each end of the rotating sleeve to establish communications between the spark-plug and the interior of the explosion cylinder.

In testimony whereof I affix my signature.

JAMES T. BISHOP.